United States Patent Office 2,862,773
Patented Dec. 2, 1958

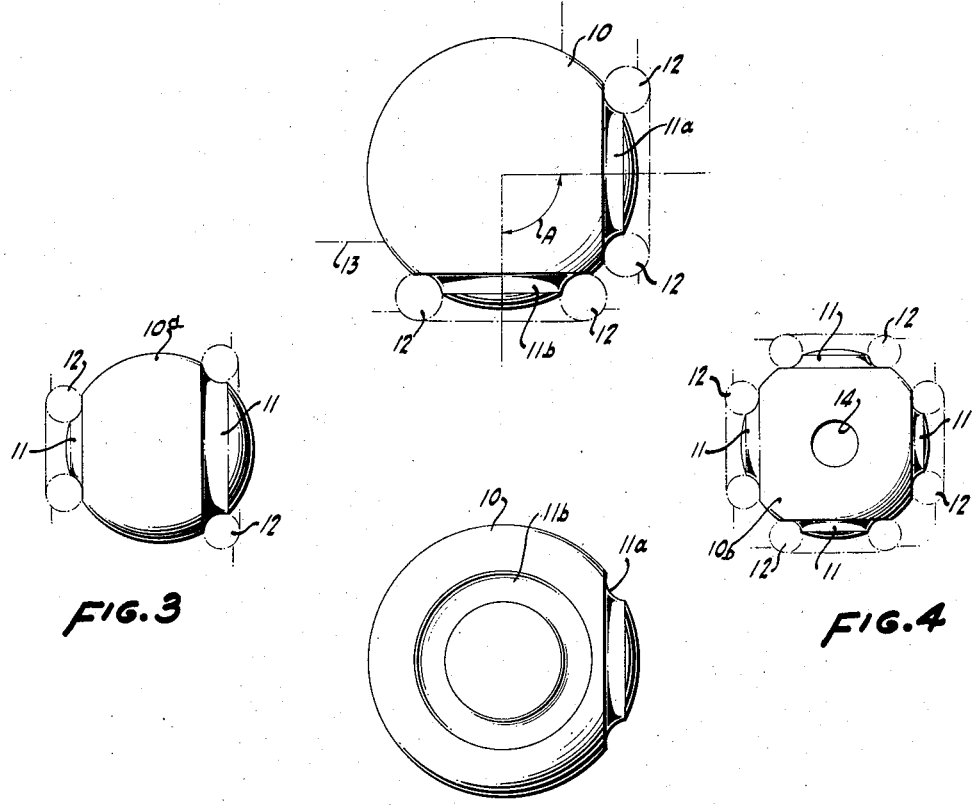

2,862,773

BEARING ELEMENT

Thomas B. Keesling, Los Gatos, Calif., assignor of one-half to C. H. Keesling, San Jose, Calif.

Application October 14, 1954, Serial No. 462,167

2 Claims. (Cl. 308—219)

The present invention relates to bearing elements and is concerned more particularly with improved construction of a bearing element which facilitates easy machining operations and a compact construction of the associated bearing, and an advantageous method of manufacturing the bearing element.

This application is a continuation in part of my co-pending application Serial No. 156,690 filed April 18, 1950, for Angle Drive and Bearing Structure, now Patent No. 2,697,362.

The problem of providing a compact rugged bearing construction for two shafts bearing a fixed angular relation to each other at their juncture or common end point, presents a serious problem, and this problem is solved by the present invention by providing a spherical bearing element, in the form for example of a hardened steel ball, and in providing on the surface of this bearing element one or more bearing races for a series of anti-friction elements, for example in the form of balls.

The above and other objects of the invention are attained as described in connection with preferred embodiments of the invention as described in the accompanying specification and as disclosed in the accompanying drawings, in which:

Figure 1 is a side elevational view of the bearing element showing in phantom lines a structure which may be associated therewith.

Figure 2 is an elevational view of the bearing element taken from the bottom of Figure 1.

Figure 3 is an elevational view of a modified form of the invention.

Figure 4 is an elevational view of a third modification of the invention showing four bearing races in the spherical bearing element.

Referring to the drawings, there is shown a spherical bearing element 10 in the form of a hardened steel ball, having a pair of machined or ground races 11a and 11b therein whose axes pass through the center of the bearing element 10 and form an angle A with respect to each other, the angle as shown being a right angle.

This bearing element 10 is adapted for seating in a spherical socket in a suitable structure 13, for example a frame or other stationary part, and a portion of the spherical surface provides mounting means for the element. The bearing races 11a and 11b are adapted to receive a series of anti-friction elements 12, by means of which suitable elements desired for journalling in angular relation to each other may be supported. These elements may be for example meshing gears, adjacent shafts, or other similar machine elements.

Figure 3 shows a modification of the invention in which two ball races 11 of different diameters are placed on opposite sides of the bearing element 10a where two axially aligned shafts must be journalled in alignment in a compact relation.

Figure 4 shows a further modification of the invention wherein four bearing races 11 are provided in the bearing element 10b for a plurality of machine elements which must be mounted in adjacent compact relation. The bearing element includes a mounting means or aperture 14 which may be symmetrically disposed with respect to the races 11.

It will be apparent from the above that the invention can be used with a plurality of races, such as three bearing races, four bearing races, or six bearing races as the case may be, so that it offers a versatile bearing element for the proper journalling in a compact fashion of a plurality of machine elements.

In manufacturing the bearing element, a bearing element 10 may be gripped in any suitable fashion, and the first bearing race 11 ground therein, and thereafter the bearing element may be seated in a mandrel which grips or engages the first bearing race ground therein and then a second, a third and a fourth bearing race ground therein as the case may be. While the bearing races may be machined before hardening the bearing element 10, it is preferred to first harden the bearing element 10, and then grind the races therein, as this provides a finished bearing race on the element in a single operation.

While I have shown and described certain preferred embodiments of the invention it will be apparent that the invention is capable of modification and variation from the form shown, so that the scope thereof should be limited only by the scope of the claims appended hereto.

I claim:

1. A bearing element comprising a substantially ball shaped member of hardened steel, said member having a spherical surface adapted to be rotatably lodged in a socket, said socket having a corresponding concave surface for slideably engaging said spherical surface, said member having a plurality of substantially circular bearing races ground in its surfaces, and a plurality of anti-friction elements positioned in each of said circular bearing races for engaging the ends of shafts, the axes of said circular bearing races being coincident with radii of said member, said bearing races being disposed in surfaces of said member such that pressure exerted on said anti-friction elements in said races is distributed among all of the anti-friction elements and presses said member against surfaces of said socket.

2. A bearing element comprising a substantially ball shaped member of hardened steel, said member having a spherical surface adapted to be rotatably lodged in a socket, said socket having a corresponding concave surface for slideably engaging said spherical surface, said member having a plurality of substantially circular bearing races formed in its surfaces opposite to surfaces thereof engaged by said socket, a plurality of anti-friction elements positioned in each of said circular bearing races for engaging the ends of shafts, each of said circular bearing races being disposed such that the center of a plane passing through corresponding points thereof intersects at right angles a radius of said ball shaped member so that pressures applied to the anti-friction elements in each of the circular bearing races is distributed among these anti-friction elements so that all of these anti-friction elements bear the load applied thereto.

References Cited in the file of this patent

UNITED STATES PATENTS

| | | |
|---|---|---|
| 252,208 | Garrigues | Jan. 10, 1882 |
| 685,575 | Coon | Oct. 29, 1901 |
| 984,855 | Schaffnit | Feb. 21, 1911 |
| 2,246,261 | Mollart et al. | June 17, 1941 |
| 2,399,539 | Braithwaite | Apr. 30, 1946 |
| 2,447,882 | Warner | Aug. 24, 1948 |
| 2,462,647 | Koza | Feb. 22, 1949 |